US007610334B2

(12) United States Patent
Henocq et al.

(10) Patent No.: US 7,610,334 B2
(45) Date of Patent: Oct. 27, 2009

(54) METHOD AND DEVICE FOR DISTRIBUTING DIGITAL DATA IN PARTICULAR FOR A PEER-TO-PEER NETWORK

(75) Inventors: Xavier Henocq, Mouaze (FR); Fabrice Le Leannec, Acigne (FR)

(73) Assignee: Canon Kabushiki Kaisha, Tokyo (JP)

( * ) Notice: Subject to any disclaimer, the term of this patent is extended or adjusted under 35 U.S.C. 154(b) by 775 days.

(21) Appl. No.: 11/130,115

(22) Filed: May 17, 2005

(65) Prior Publication Data

US 2006/0036813 A1    Feb. 16, 2006

(30) Foreign Application Priority Data

May 18, 2004    (FR)    .................................. 04 05414

(51) Int. Cl.
*G06F 13/28*    (2006.01)
(52) U.S. Cl. ......................................... 709/203; 725/98
(58) Field of Classification Search ................ 709/203, 709/204, 206–207, 217–229, 247; 705/5, 705/6, 1, 28, 26, 27, 56, 35, 37, 44, 10, 14, 705/30, 7; 725/98, 86, 109, 92; 382/232, 382/233, 246; 713/200
See application file for complete search history.

(56) References Cited

U.S. PATENT DOCUMENTS

| 6,178,204 | B1 * | 1/2001 | Hazra ..................... 375/240.25 |
| 6,442,658 | B1 | 8/2002 | Hunt et al. .................. 711/158 |
| 6,574,715 | B2 | 6/2003 | Challenger et al. |
| 2003/0018818 | A1 * | 1/2003 | Boliek et al. ................. 709/247 |
| 2004/0078491 | A1 | 4/2004 | Gormish et al. ............. 709/247 |
| 2004/0136598 | A1 * | 7/2004 | Le Leannec et al. ........ 382/232 |
| 2004/0175047 | A1 * | 9/2004 | Gormish et al. ............. 382/232 |
| 2004/0177155 | A1 * | 9/2004 | Enokida et al. ............. 709/236 |
| 2004/0205199 | A1 * | 10/2004 | Gormish ..................... 709/229 |
| 2005/0104887 | A1 | 5/2005 | Henocq et al. |

FOREIGN PATENT DOCUMENTS

WO    WO 00/49571    8/2000

OTHER PUBLICATIONS

McCanne, S., Vetterli, M. and Jacobson Van, Low-Complexity Video Coding for Receiver-Driven Layered Multicast, IEEE Journal on Selected Areas in Communications, vol. 15 (6), Aug. 1997.*
"JPEG 2000 Part I Final Draft International Standard", Aug. 18, 2000.

(Continued)

*Primary Examiner*—David R Vincent
*Assistant Examiner*—Ola Olude-Afolabi
(74) *Attorney, Agent, or Firm*—Fitzpatrick, Cella Harper & Scinto (57) ABSTRACT

A method of transmitting digital images implemented in a server device able to cooperate with at least one client device connected to the server device through a telecommunication network, where the digital images comprising a plurality of elementary entities and the client device is able to request from the server device a transmission of at least one elementary entity. The method comprises storing statistical data for each of the elementary entities, and at the client device's request, transmitting to it the elementary entities in accordance with the statistical data, wherein the statistical data comprises the quantity of data transmitted following the requests to the requesting client devices.

23 Claims, 6 Drawing Sheets

OTHER PUBLICATIONS

"JPEG 2000 image coding system—Part 9: Interactivity tools, APIs and protocols—Final Committee Draft 2.0".

Lee, R., et al., "Caching Schema for Mobile Web Information Retrieval", Graduate School of Informatics, Kyoto University, Japan.

Taubman, D., et al., "Architecture, philosophy, and performance of JPIP: Internet protocol standard for JPEG 2000.", Proceedings of SPIE, Bellingham, VA, vol. 5150, No. 1, 2003, pp. 791-805.

Deshpande, S., et al., "HTTP streaming of JPEG 2000 images.", Proceedings of International Conference on Information Technology, Apr. 2, 2001, pp. 15-19, XP002193324.

Martinez, K., et al., "Object browsing using the Internet Imaging Protocol.", Computer Networks, Elsevier Science Publishers B.V., vol. 33, No. 1-6, Jun. 2000, pp. 803-810.

* cited by examiner

METHOD AND DEVICE FOR DISTRIBUTING DIGITAL DATA IN PARTICULAR FOR A PEER-TO-PEER NETWORK

FIELD OF THE INVENTION

The present invention concerns in general terms the manipulation, transmission and display of digital images in a telecommunications system, particularly in the context of a client/server application.

A particularly advantageous favored, but not exclusive, application of the present invention is the distribution and display of multiresolution digital images, in particular in the context of the JPEG2000 standard and the JPIP protocol.

BACKGROUND OF THE INVENTION

One major problem with client/server applications for manipulating images lies in their lack of reactivity. This is because the time elapsed between the request for an image by a user and the display of the image requested on the client machine of the user often proves to be unacceptable from the point of view of the users.

A first solution to the problem indicated above can be found in the progressive display of the image requested. In this case, the application does not await the entire reception of the data in order to start the display of the image requested. A first degraded version of the image is first of all displayed, and then this is refined as the data are received.

An image format allowing progressive display is however necessary for implementing such a solution. This is because an image must be capable of display even when the bitstream of the image has been received only partially. In addition, if the bitstream is capable of partial transmission, the question of the order of transmission of the data is then posed and need to be resolved.

A second solution to the problem indicated above consists of preserving the data in the cache memory of the client device. In this way, a multiple transmission of identical data is avoided. This approach makes it possible to reduce the display times of the data when the latter are already present in the cache memory.

Concerning the progressive display and the organization of the transmission of the data in the bitstream, software referred to as Kakadu (registered trade mark) is known in the state of the art, developed by David Taubman in the context of the JPEG2000/JPIP standard.

In the Kakadu software, the elementary entities of the bit stream, referred to as "precincts" and corresponding to spatial positions of the image, are ordered so as to first of all send the precincts situated at the center of the image. Such an approach has the drawback of taking as its assumption the fact that the interesting parts of the images are at the center of them. This assumption is ill-founded since the interesting areas may just as well be situated on the peripheral parts of the images.

Concerning the preservation of data in the cache memory of a client device, various solutions have been proposed and form part of the state of the art.

Thus protocols are known in which "cache" and "no cache" commands are provided for indicating explicitly to proxy servers, the data which must or must not be placed in cache memory. The following protocols, in particular, are known to the inventors for supplying cache management commands:

the protocol RFC2616—Hypertext Transfer Protocol—http/1.1.;
the protocol RFC1945—Hypertext Transfer Protocol—http/1.0.; and
the JPIP protocol presented in *JPEG*2000 Image Coding System—Part 9: Interactivity Tools, APIs and Protocols—Final Committee Draft. ISO/IEC JTC1/SC29 WG1 N3052, R. Prandolini, S. Houchin, G. Colyer, 25 Jul. 2003.

The approaches adopted in the above protocols have in particular the drawback of not allowing suitable management when the space available or released in the cache memory is not sufficient to store the data recently received. In addition, in these protocols, the server device explicitly manages the cache memory of the proxy. Such a technique is difficult to manage when the server device is in communication with many client devices.

In the article *Caching schema for mobile web information retrieval, $2^{nd}$ International Workshop on Web Dynamics, in the 11th International World Wide Web Conference, May 2002*, a method is described, in the field of Internet applications, for managing cache memories according to which data (web pages, metadata, etc) are prestored in the cache memory of a portable multimedia unit (portable electronic organizer, portable computer, etc). However, in this method, the selection of the data to be stored must be done manually by the user. Once stored, the data can be deleted from the cache memory or be updated according to the geographical position of the portable multimedia unit.

The need for intervention by the user in the above method is a drawback and it would be desirable for all the tasks relating to the management of the cache memory to be carried out automatically or almost automatically.

Still in the field of the Internet, there are also known, through U.S. Pat. No. 6,574,715 (IBM) a method and device for managing internal and external caches in a data processing system. In accordance with this method of IBM, a server stores modifiable web pages either in a local cache or in external caches situated for example in proxy agents. The selection of a cache, local or external, is carried out according to a degree of change in the web pages. A process of verifying consistency between the pages stored in the external caches and those stored in the local cache is implemented by the server.

In this IBM method, the management of the external caches of the proxy agents is centralized by the server. Consequently the application of the external cache management functionalities of this method to the management of caches of several client devices in a client/server application does not enable a client device to manage its cache itself.

SUMMARY OF THE INVENTION

The present invention concerns firstly a method of transmitting digital images implemented in a server device and which allows improvement in the display of the digital images by an organization of the transmission of the elementary entities, or precincts, of a digital image according to a real interest of the users for these elementary entities.

The method of transmitting digital images according to the invention implemented in a server device able to cooperate with at least one client device connected to the server device through a telecommunication network, the digital images comprising a plurality of elementary entities and the client device being able to request from the server device a transmission of at least one elementary entity, comprises the steps of:

storing statistical data for each of the elementary entities; and
at the client device's request, transmitting to it the elementary entities in accordance with the statistical data, wherein said statistical data comprise the quantity of data transmitted following the requests to the requesting client devices.

Correspondingly, the present invention also concerns a device for transmitting digital images incorporated in a server device for implementing the digital image transmission and manipulation method briefly described above.

The device for transmitting digital images according to the invention incorporated in a server device able to cooperate with at least one client device connected to the server device through a telecommunications network, the digital images comprising a plurality of elementary entities and the client device being able to request from the server device a transmission of at least one elementary entity, comprises:

means for storing statistical data for each of the elementary entities; and means for transmitting to the client device, on request from it, the elementary entities in accordance with are the statistical data, wherein said statistical data comprise the quantity of data transmitted following the requests to the requesting client devices.

The above-indicated characteristics of the invention furnish advantages such as the possibility at the client device of obtaining an intelligent display of the image requested whilst starting this very rapidly. The reactivity at the client device is substantially improved, as well as the quality of the rendition of the display throughout the entire transmission of the elementary entities of the image.

According to another characteristic of the invention, the statistical data comprise a transmission rate calculated for each of the elementary entities and which is a function of the number of requests received for the elementary entity in question and the quantity of data transmitted following on from these requests to the requesting client devices for the elementary entity in question.

The above characteristic of the invention provides a measure for assessing the importance of each elementary entity.

The invention preferably provides for a sending statistical data conjointly with the corresponding elementary entities.

According to another characteristic of the invention, prior to the storage of said statistical data, the statistical data are coded in a sequential order corresponding to an order of the respective spatial positions of the corresponding elementary entities in the digital image, so as to exploit spatial correlations existing between the elementary entities and thus to reduce a bit rate of the statistical data by the removal of a redundant transmission of identical successive quantized values of the statistical data.

The above characteristics of the invention furnish a first solution for reducing the coding cost of the statistical data, which is applicable in particular in the context of the JPEG2000 standard for a coding of the statistical data in the form of metadata.

According to yet another characteristic of the invention, prior to the storage of said statistical data, the statistical data are coded in a sequential order corresponding to an order of importance of the corresponding elementary entities, so as to exploit correlations existing between the quantized values of the statistical data and thus reduce a bit rate of the statistical data by the elimination of a redundant transmission of identical successive quantized values.

The above characteristics of the invention furnish a second solution for reducing the coding cost of the statistical data, which is also applicable in the context of the JPEG2000 standard for a coding of the statistical data in the form of metadata.

The coding and storage of the statistical data in the digital image file are preferably carried out at substantially regular intervals of time.

According to another aspect, the present invention concerns a method of receiving digital images implemented in a client device and which allows improvement of the display of the digital images by offering to the client device the possibility of individual and automatic management of its cache according to a real interest of the users for elementary entities of the images requested.

The method of receiving digital images according to the invention implemented in a client device connected to at least one server device through a telecommunications network, the digital images comprising a plurality of elementary entities and the client device being able to request from the server device a transmission of at least one elementary entity, comprises the steps of:

receiving at least one elementary entity requested and statistical data corresponding to the elementary entity, the statistical data allowing the evaluation of a relative importance for a user of the elementary entity; and updating a cache comprising elementary entities of the digital image according to the respective importances of the elementary entities obtained from the statistical data so as to allow display of the elementary entities.

Correspondingly, the present invention also concerns a device for receiving digital images incorporated in a client device for implementing the digital image reception and display method briefly described above.

The device for receiving digital images according to the invention incorporated in a client device connected to at least one server device through a telecommunications network, the digital images comprising a plurality of elementary entities and the client device being able to request from the server device a transmission of at least one elementary entity, comprises:

means for receiving a transmission file comprising at least one elementary entity requested and statistical data corresponding to the elementary entity, the statistical data allowing the evaluation of a relative importance for a user of the elementary entity;

means for extracting the statistical data from the transmission file; and means for updating a cache comprising elementary entities of the digital data according to the statistical data extracted so as to allow display of the elementary entities according to their relative importances.

The above-indicated characteristics of the invention afford advantages such as the possibility at the client device of automatically selecting in an intelligent manner the elementary entities which must be eliminated/kept in the cache and allow a reduction in the risk of multiple requests for identical elementary entities by the blind management of the cache. The above characteristics help to improve the reactivity and quality of the rendition of the display throughout the entire transmission of the elementary entities of the image.

According to another characteristic of the invention, the updating of the cache comprises a release of sufficient memory space for writing the received elementary entity in the cache, by an elimination in the cache from at least one elementary entity of lesser importance than that of the elementary entity received.

According to yet another characteristic of the invention, the release of memory space comprises a selection, as being the elementary entity of lesser importance to be eliminated, of the elementary entity having the lowest importance amongst the elementary entities present in the cache and which are not currently being displayed.

According to other aspects, the invention also concerns an information processing device able to function as a server device, an information processing device able to function as a client device, a telecommunications system, and information media which can be read by a computer system and computer programs for implementing the methods of the invention briefly described above.

The invention finds favored applications in the distribution and display of multiresolution digital images in the context of the JPEG2000 standard. The digital image file is then a file of the JPEG2000 type and the elementary entity is requested of the server device by the client device by means of a protocol of the JPIP type. In addition, the statistical data are encapsulated typically in the form of metadata in the digital image file.

The JPEG2000/JPIP standard provides a framework which is very favorable to the application of the invention since it greatly facilitates the progressive display and management of the cache. In addition, with the division of the bitstream into elementary spatial entities (precincts), it is relatively simple to transmit, display and store the JPEG2000 images in a partial manner.

Other aspects and advantages of the present invention will emerge more clearly from a reading of the following description of preferred embodiments, this description being given solely by way of non-limiting example and made with reference to the accompanying drawings.

DETAILED DESCRIPTION

Figure 1:
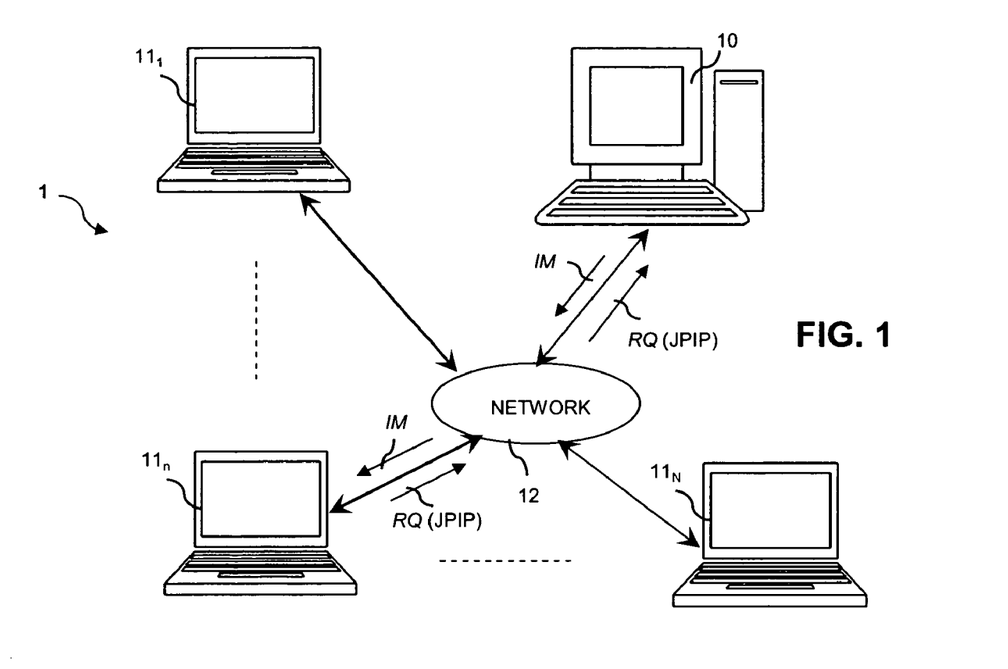
FIG. 1 shows the general structure of an embodiment of the telecommunications system according to the invention.

With reference to FIG. 1, the preferred embodiments of the methods and devices of the invention presented below are described in the general context of a telecommunications system according to the invention, designated overall by the reference 1, designed for the distribution of multiresolution digital images from a server device 10 to a plurality of client devices $11_1$ to $11_N$.

The preferred embodiments of the invention are described below in the context of a client/server application for handling and displaying images. In this application, the server device 10 stores digital images IM in the JPEG2000 format and the client devices $11_1$ to $11_N$ can access these digital images IM by means of the JPIP protocol.

The reader can usefully refer to the following references in order to more completely understand the functioning of the methods and devices according to the invention, namely:

Reference [1]: JPEG2000, Part I, Final Draft International Standard (corrected and formatted) ISO/IEC JTC1/SC29 WG1, September 2000; and Reference [2]: JPEG2000 Image Coding System—Part 9: Interactivity Tools, APIs and Protocols—Final Committee Draft. ISO/IEC JTC1/SC29 WG1 N3052, R. Prandolini, S. Houchin, G. Colyer, 25 Jul. 2003.

The digital images IM, or portions of digital images, are delivered by the server device 10 to the client devices $11_1$ to $11_N$ following on from requests RQ transmitted to the server device 10 by the client devices $11_1$ to $11_N$.

In accordance with the invention, as soon as a digital image or a portion thereof is requested, the statistical data are calculated on elementary entities of the image or image portion requested. The elementary entities forming the digital images are called "precincts" in the remainder of the description. In accordance with the invention, the more a precinct is requested, the more important it is considered to be. Each digital image or image portion will therefore possess statistical data per precinct which are peculiar to it.

A telecommunications network 12, being made of constituting for example the Internet and/or a local area network (LAN), connects together the server device 10 and the client devices $11_1$ to $11_N$. The network 12 is here a network capable of supporting connection modes of the client-server type.

The server device 10 is built around an information processing device or machine, typically a personal microcomputer or a workstation, in which one or more computer programs are installed in order to implement the algorithms necessary for implementing the digital image manipulation and transmission method according to the invention.

In a similar manner, the client devices $11_1$ to $11_N$ are each built around an information processing device or machine, typically a personal microcomputer or a workstation, in which one or more computer programs are installed in order to implement the algorithms necessary for implementing the digital image reception and display method according to the invention.

Figure 2:
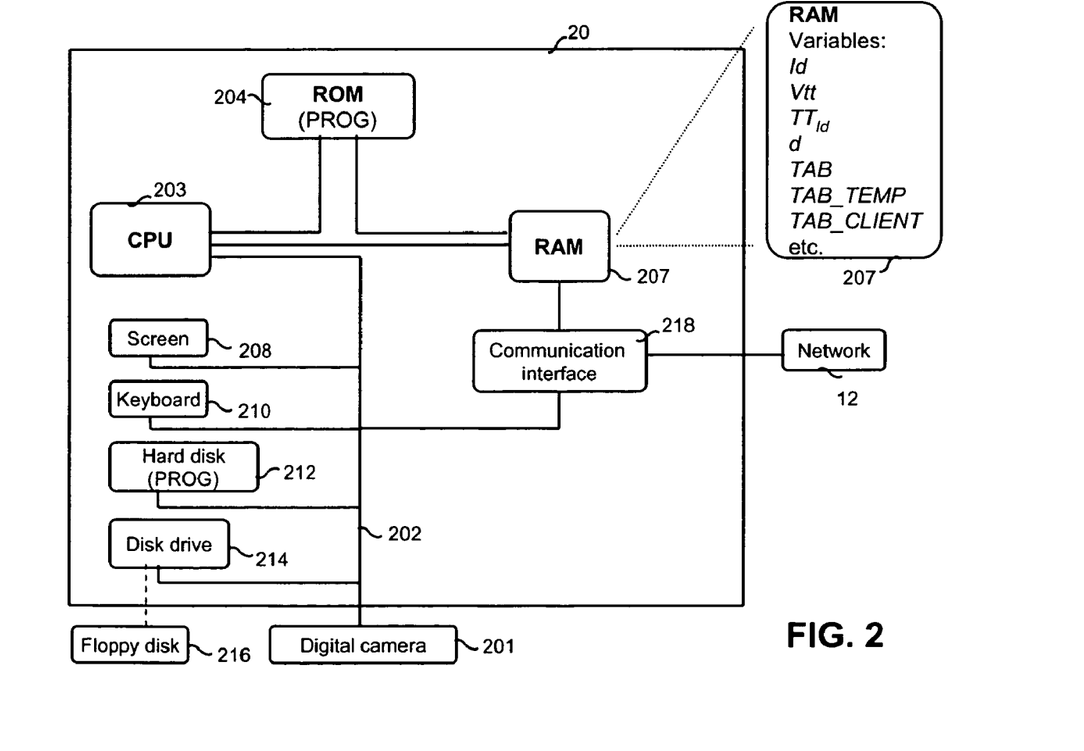
FIG. 2 shows a particular hardware configuration of information processing devices suitable for implementation of the methods according to the invention.

With reference to FIG. 2, an information processing device or machine 20 able to function as a server device 10 in the telecommunications system 1 according to the invention is now described essentially in its hardware configuration.

In FIG. 2, the computer 20, which can typically be a microcomputer or a workstation, is connected to various peripherals, for example a digital camera 201 for the capture of images or any other image acquisition or storage device, such as a scanner, supplying images to the computer. These images can be stored in the storage means which the computer has, such as a hard disk 212.

The computer 20 also comprises a communication interface 218 connected to the communication network 12 and able to transmit and receive digital information. The computer 20 is preferably equipped so as to have a permanent connection to the network 12, in order to offer continuous service.

The computer 20 also comprises data storage means such as the hard disk 212, and a disk drive 214 for writing data on a floppy disk 216 and reading these data. The computer 20 can also comprise a reader (not shown) for compact disks (CD-ROMs or DVD-ROMs) on which the images can be stored as well as a computer card (PC-CARD) reader (not shown).

According to a preferred embodiment, the executable codes of one or more programs PROG for implementing the invention are stored on the hard disk 212.

According to a variant embodiment, the executable code of the program or programs PROG are stored in a ROM memory ("read only memory") 204 of the computer.

In general terms, an information storage means which can be read by a computer or a microprocessor, integrated or not into this computer, and possibly removable, is adapted to store the program or programs PROG implementing the invention.

The computer 20 also comprises a screen 208 for displaying the images and a pointing device (not shown), such as a mouse or optical pen, as well as a keyboard 210 so as to be able to interact with the program or programs PROG of the invention.

The computer 20 comprises a central processing unit (CPU) 203, for example a microprocessor, which controls and directs the execution of the instructions of the program or programs PROG of the invention stored on the ROM 204 or on the hard disk 212.

The computer 20 also comprises a RAM memory (random access memory) 207. As is clear from FIG. 2, in an enlargement situated to the right of the figure, the RAM 20 comprises registers intended to store variables, in particular variables Id, Vtt, $TT_{Id}$, d, TAB, TAB_TEMP and TAB_CLIENT, created and modified during the execution of the program or programs PROG according to the invention. The definitions and uses of the variables indicated above will be dealt with subsequently, in the remainder of the description.

The configuration of an information processing device able to function as any client device $11_n$ in the telecommunications system 1 according to the invention is similar to that of the computer 20 described above. It should however be noted that the client device should not use any image acquisition device such as the digital camera 201.

The functioning of the server device 10 is now more particularly described with reference to FIGS. 3 to 5.

The function of the server device 10 is essentially to transmit to the client devices $11_1$ to $11_N$ the digital images and data which have been requested of it by these. In accordance with the invention, the statistical data are used to order the sending of the precincts PR and thus allow progressive display adapted to the digital image IM on the client device $11_n$ side.

The server device 10 is responsible for several essential aspects of the invention. Amongst these essential aspects, the most important concerns the calculation, updating and storage of the statistical data on the digital images.

In order to define in a digital image the relative importance of a precinct PR having an intra-class identifier Id, the invention has recourse to the measurement of a corresponding transmission rate $TT_{Id}$ for this precinct PR. A particular measure for the transmission rate $TT_{Id}$ has been developed by the inventors for the object of the present invention.

The intra-class identifier Id is a unique identifier characterizing a precinct PR of an image. The identifier Id is given typically by the following equation:

$$Id = t + (c + s \times \text{num\_components}) \times \text{num\_tiles} \quad (1)$$

in which, t is the index of the tile to which the precinct PR belongs, c is the index of the component to which the precinct PR belongs, s is the index of the precinct PR in its tile and in its component, num_components is the number of components in the image, and num_tiles is the number of tiles in the image.

The transmission rate $TT_{Id}$ of a given precinct PR is a function of a number of requests made for this precinct PR by the client devices $11_1$ to $11_N$. However, having regard to the fact that a precinct PR may be requested and/or transmitted partially, a measure limited solely to a counting of the requests RQ does not make it possible to have an advantageous measurement of the interest afforded by the users to a given precinct PR. A term representing the quantity of data transmitted for the precinct PR has been integrated in the calculation of the transmission rate $TT_{Id}$. The transmission rate $TT_{Id}$ is given by the following equation:

$$TT_{Id} = \frac{\sum_{k=0}^{N_r^{Id}-1} l_{Id}^k}{\sum_j \sum_{k=0}^{N_r^j-1} l_j^k} \quad (2)$$

in which, $l_{Id}^k$ is the length of data, counted in bits, transmitted during a request $RQ_k$ for the precinct PR, and $N_r^j$ is the number of requests received by the server device 10 for the precinct $PR_j$, with the index j which runs through all the intra-class identifiers Id of the precincts PR of the image in question.

Figure 3:
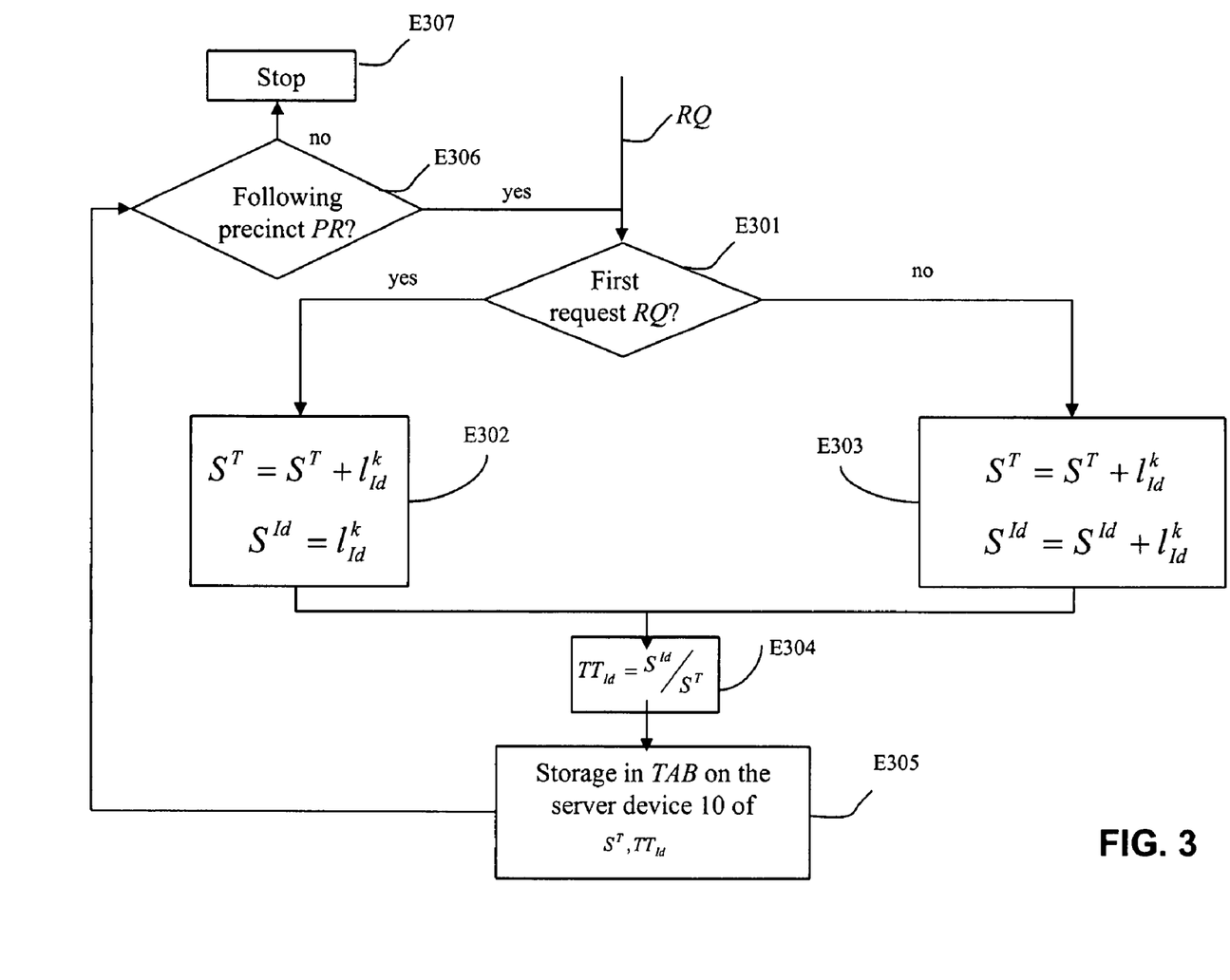
FIG. 3 is a functional flow diagram relating to the calculation of a transmission rate for the precincts in the server device.

With reference more particularly to FIG. 3, a description is now given of an example of an algorithm for calculating and updating statistical data according to the invention, adapted to this preferred embodiment in which the statistical data are represented by the transmission rate $TT_{Id}$.

As shown in FIG. 3, the algorithm for calculating and updating the transmission rate $TT_{Id}$ starts off at a step E301 with a test intended to check whether or not a current request RQ for a precinct PR is a first request.

In the affirmative at step E301, that is to say in the case where the current request RQ is a first request, there is performed, after step E301, a step E302 in which two variables $S^T$ and $S^{Id}$ are initialized, corresponding respectively to the denominator and numerator of equation (2), namely:

$$S^T = S^T + l_{Id}^k, \text{ and}$$

$$S^{Id} = l_{Id}^k.$$

In the negative at step E301, that is to say in the case where the current request RQ is not a first request, a step E303 is performed, following step E301, during which the variables $S^T$ and $S^{Id}$ are updated in the following manner:

$$S^T = S^T + l_{Id}^k, \text{ and}$$

$$S^{Id} = S^{Id} + l_{Id}^k.$$

A step E304, following steps E302 and E303, makes it possible to calculate the transmission rate $TT_{Id}$ by means of the following equality:

$$TT_{Id} = S^{Id}/S^T.$$

Next, a step E305 is executed during which the values obtained for the variable $S^T$ and the transmission rate $TT_{Id}$ are stored in a table TAB on the server device 10. The table TAB comprises $N_p + 1$ storage positions, $N_p$ being the number of precincts PR in the image. The table TAB then allows the storage of $N_p$ transmission rates $TT_{Id}$ corresponding to the $N_p$ precincts PR of the image and the storage of the current value of the variable $S^T$.

It should be noted that the variables $S^{Id}$ can be deduced from $S^T$ and the transmission rates $TT_{Id}$ stored, when this is necessary in the algorithms of the invention. In addition, it is considered here that the server device 10 is capable, from the position of a transmission rate $TT_{Id}$ in the table TAB, of finding without difficulty the intra-class identifier Id to which this corresponds, and vice-versa.

A step E306 is executed after the step E305 in order to next the process of a following requested precinct PR. In the case where no other precinct PR is requested, the execution of the algorithm ends with a stop step E307.

Operations of coding and inserting statistical data represented by the transmission rates $TT_{Id}$ in a JPEG2000 file are described below. Two coding methods are presented here by way of example of possible embodiments.

Reference [1] indicated above defines in its Annex 1 the format of a JPEG2000 file.

Briefly the JPEG2000 bit streams (codestreams), that is to say the useful data representing the compressed image, as well as other information concerning the codestream, are encapsulated in an encapsulation entity called a "box". In general terms, all the information contained in a JPEG2000 file are encapsulated in boxes. The codestream of each box begins systematically with its length, coded in 16 bits, and its type.

For the requirements of the invention, the inventors created a box of a novel type intended for the encapsulation of statistical data and which is inserted at the end of the JPEG2000 codestream. This novel box does not prevent compatibility with the JPEG2000 standard having regard to the fact that this standard specifies that non-standardized boxes can be used.

In the remainder of the description, the box intended for the statistical data is referred to as "metadata-stat".

Figure 4:
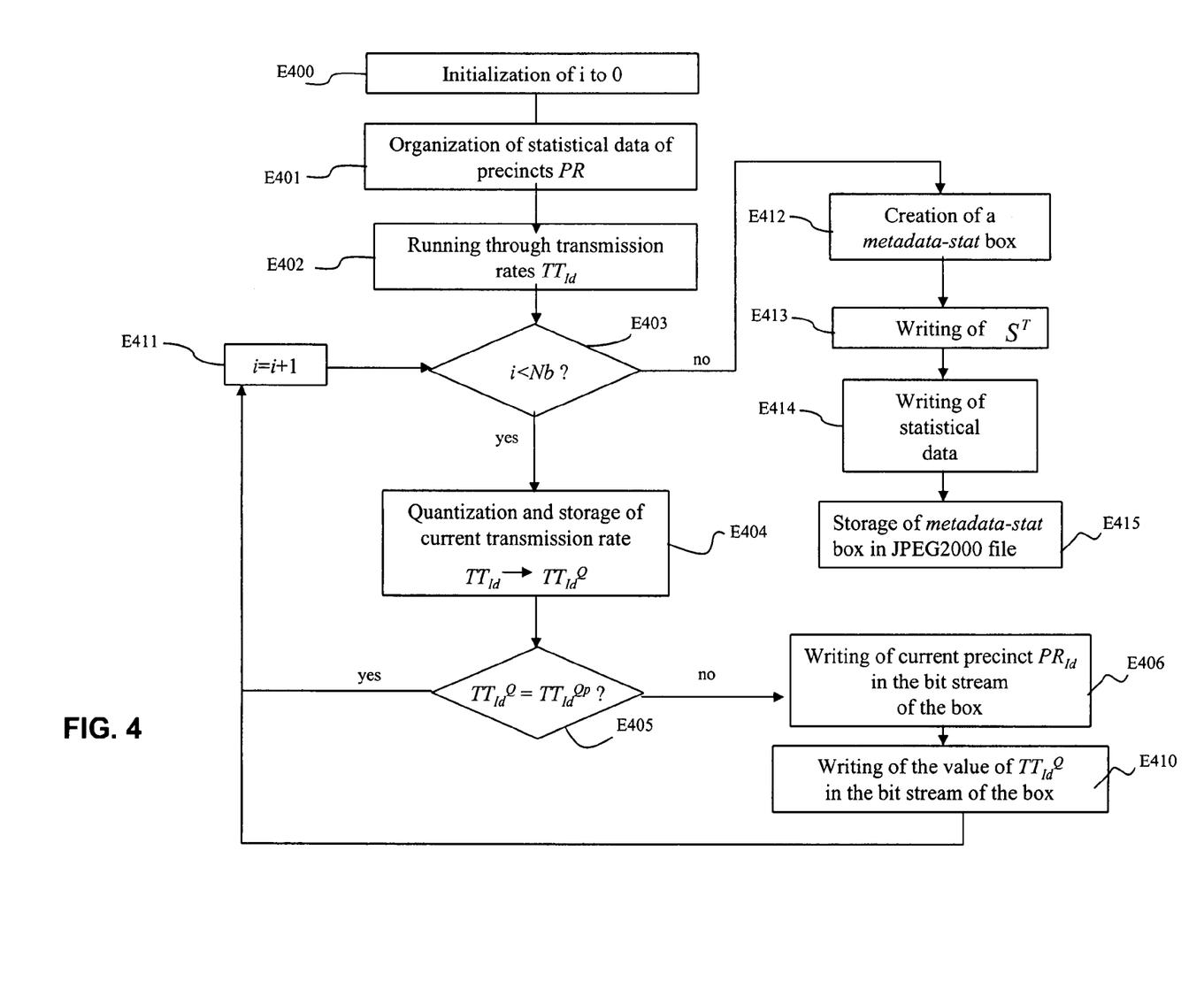
FIG. 4 is a functional flow diagram relating to the coding of the transmission rate in the form of metadata.

With reference to FIG. 4, first and second coding methods for generating the box metadata-stat are now described.

According to the invention, the first and second methods of coding metadata-stat boxes are preferably implemented by the server device 10 at regular intervals, for example, in this preferred embodiment, every day at a fixed time.

The first and second methods of coding metadata-stat boxes differ essentially through the coding used for the statistical data. In both cases, the object is to reduce the rate allocated to the coding of these data by avoiding inserting a statistical measurement for each precinct PR.

The first method of coding metadata-stat boxes takes advantage of the correlations existing between the precincts PR having close intra-class identifiers Id.

As shown in FIG. 4, the algorithm corresponding to the first coding method starts at step E400 with the initialization to 0 of the variable i serving for counting the precincts PR.

A step E401 is executed, at the following step E400. This step E401 organizes the statistical data of each precinct PR in the order of their identifier Id.

Step E401 is followed at step E402 by the running through of the statistical data, namely the transmission rates $TT_{Id}$. In this first coding method, the function of steps E401 and E402 are for function to run through the table TAB from position 0 to the position $N_p-1$.

A step E403 is then executed in order to determine whether or not there remain precincts PR to be processed. For this purpose, the index i of the precinct $PR_i$ currently being processed is compared with number Nb of precincts to be processed.

In the affirmative at step E403, that is to say in the case where i<Nb and there remain precincts PR to be processed, step E403 is followed by a step E404, during which the value of the current transmission rate $TT_{Id}$ is quantized. A conventional scalar quantization method is employed for this purpose at step E404. The values of the transmission rate $TT_{Id}$ being between 0 and 1, this range of values from 0 to 1 is divided into 256 intervals each having a size equal to $\frac{1}{256}$. The transmission rate $TT_{Id}$ takes the value of the lower bound of the interval in which it is situated. The value allocated to the transmission rate $TT_{Id}$ is then coded in 8 bits.

The quantization step E404 is followed by the step E405, during which it is checked whether or not the current quantized value $TT_{Id}^Q$ of the transmission rate is equal to the previous quantized value $TT_{Id}^{Qp}$ of the transmission rate.

In the affirmative at step E405, that is to say when the current and previous values $TT_{Id}^Q$ and $TT_{Id}^{Qp}$ of the transmission rate are equal, the index i is incremented by 1 at a step E411 and the algorithm loops back onto step E403, described above, for a further execution of this step.

In the negative at step E405, that is to say when the current and previous values $TT_{Id}^Q$ and $TT_{Id}^{Qp}$ of the transmission rate are different, a step E406 is then executed during which a writing of the identifier Id of the current precinct PR is effected. This writing is effected in accordance with the method recommended in paragraph A.2.3 of reference [2] indicated above.

After step E406, a step E410 is executed, during which there is effected a writing of the value, for example coded in 8 bits, of the current transmission rate $TT_{Id}$. Step E410 is also followed by step E411 described above.

When the response obtained at the conditional step E403 is negative, that is to say when there remain precincts PR to be processed, step E403 is then followed by a step E412 corresponding to the creation of the metadata-stat box.

A step E413 is executed after step E412 in order to insert in the metadata-stat box the current value of $S^T$ which was stored in the memory of the server device 10 at step E305 of FIG. 3.

A step E414 is then executed in order to proceed with the insertion in the metadata-stat box of the statistical data coded at steps E403 to E411.

The metadata-stat box is then stored in the JPEG2000 file at a step E415. In the case where a metadata-stat box was already present in the JPEG2000 file, this is replaced by the new metadata-stat box.

Concerning the second method of coding metadata-stat boxes which is now described below, this second method will preferably be used with a reliable network protocol such as TCP. This is because the use of such a protocol guarantees that the client device $11_n$ will indeed receive all the data and will be in a position to find the transmission order of these.

In accordance with the invention, it is considered hereinafter that the server device 10 follows, for the transmission of the precincts PR, a transmission order which is fixed by virtue of the statistical data. To each precinct PR there corresponds a serial number NO and the importance of a precinct PR decreases when the serial number NO increases. The precinct PR having the number NO=0 is the most important precinct PR.

The second coding method takes advantage of the correlations existing between the precincts PR having close serial numbers NO.

Like the algorithm of the first coding method described above, the algorithm of the second coding method starts at step E400 shown in FIG. 4.

Step E400, as well as steps E402 to E406 and E410 to E415 also shown in FIG. 4, form part of the algorithm of the second coding method and are identical to those of the algorithm of the first coding method described above.

Step E401 of the algorithm of the second coding method differs from that of the algorithm of the first coding method by the fact that the statistical data of each precinct PR are organized according to their serial number NO.

In the second coding method, step E401 creates a temporary table TAB_TEMP from the table TAB. The table TAB_TEMP will contain the same data as the table TAB, but stored in their transmission order. At step E406 the serial number NO of the current precinct PR is written. For this writing, the procedure recommended in paragraph A.2.3 of reference [2] described above is used.

In accordance with this second coding method, the table TAB_TEMP is deleted at the end of the execution of the algorithm.

The order of running through the statistical data ensures here better correlation between the transmission rates $TT_{Id}$ and this second coding method correspondingly allows a reduction in the size of the metadata-stat box compared with that obtained with the first coding method.

Figure 5:
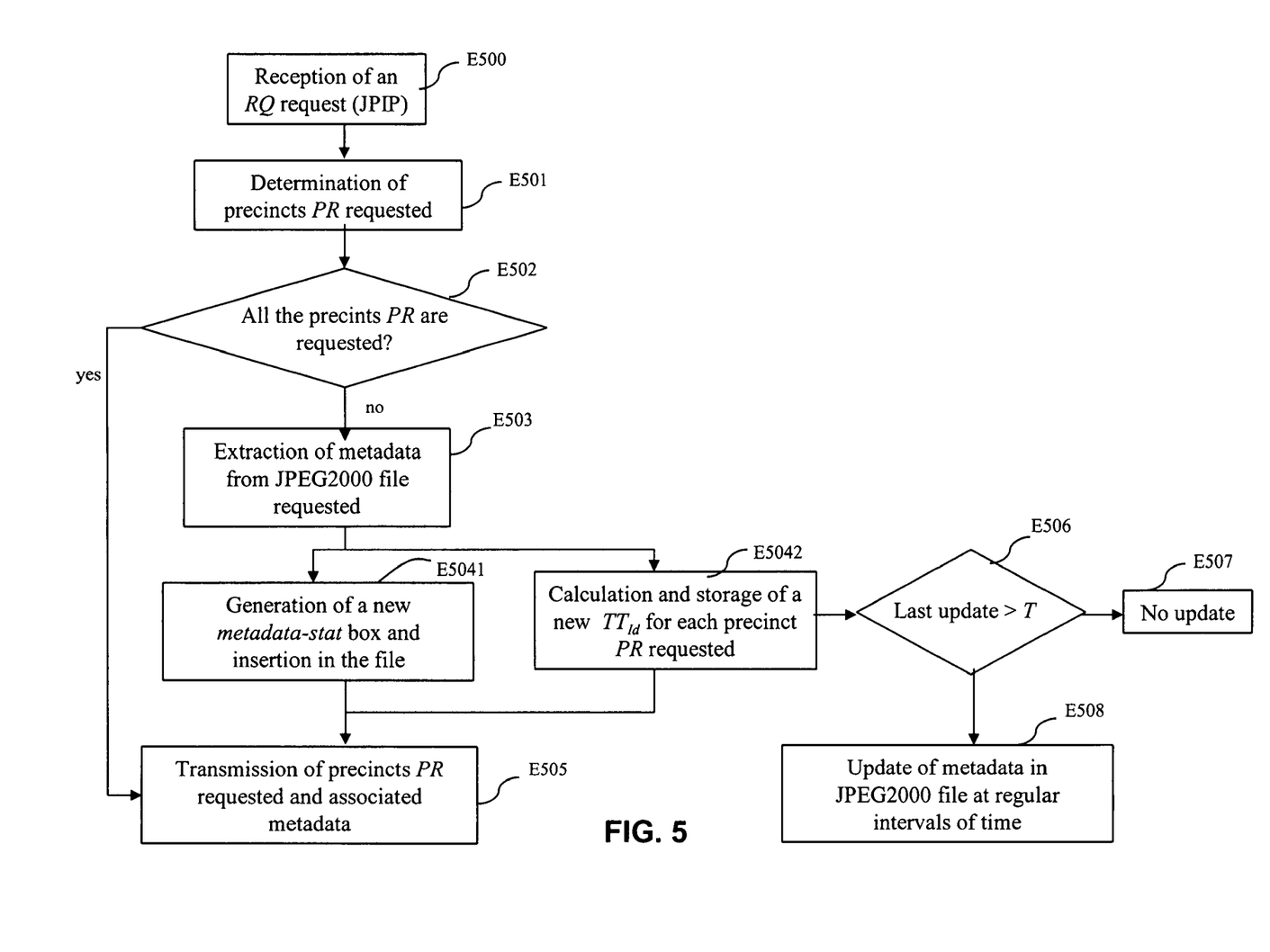
FIG. 5 is a functional flow diagram relating to the functioning of the server device.

With reference to FIG. 5, the functioning of the server device 10 when a request RQ is received coming from a client device $11_n$ will now be described.

The algorithm of FIG. 5 showing the functioning of the server device 10 starts with a step E500 during which a request RQ is received coming from a client device $11_n$. The request RQ is sent according to the JPIP protocol.

Next, from the request RQ, a step E501 makes it possible to deduce the precincts PR requested as well as the quantity of data necessary for each precinct PR.

Step E501 is followed by a step E502, during which it is checked whether or not all the precincts PR of the image have been requested.

In the affirmative at step E502, that is to say when all the precincts PR of the image have been requested, step E505 is then executed in order to transmit the JPEG2000 file containing the metadata-stat box, by means of the JPIP protocol.

The above process begins with the sending of the main header of the image, the headers of the tiles requested and the metadata-stat box. The main header and the headers of the tiles requested are respectively the headers "main header data-bin" and "tile data-bin" described in paragraph A.3 of reference [2] indicated above.

Next, the precincts PR are sent, complying with the order of importance thereof. In order to determine the importance of the precincts PR, the server device 10 can read the table TAB or the metadata-stat box contained in the JPEG2000 file.

In the negative at step E502, that is to say when it is determined that not all the precincts PR of the image have been requested, a step E503 is executed in order to generate a new metadata-stat box concerning only the precincts PR requested.

In order to generate this new metadata-stat box, the server device 10 extracts, at step E503, the current metadata-stat box from the JPEG2000 file concerned.

From the current metadata-stat box, the server device 10 extracts the statistical data concerning the precincts PR requested and inserts these, at step E5041, in a new metadata-stat box. The new metadata-stat box is then inserted in the JPEG2000 file to be sent, in place of the current box which was a precalculated box.

Step E5041 is followed by the previously described step E505.

In parallel with the execution of step E5041, the server device 10 launches steps E5042, E506, E507 and E508.

At step E5042, the server device 10 updates the values of the transmission rates $TT_{Id}$ and $S^T$ stored in the table TAB. This updating operation was described above with reference to FIG. 3.

Step E5042 is followed by step E506, which determines whether or not the last updating of the metadata-stat box was performed in the last T hours (T=24, for example).

In the affirmative at step E506, that is to say when the last update is no older than T hours, no update is carried out, step E507.

In the negative at step E506, that is to say when the last update dates from more than T hours, the metadata-stat box is updated at step E508.

The functioning of the client device $11_n$ in the case of use of the first method of coding the metadata-stat boxes presented above is now described with reference to FIGS. 6 and 7.

Figure 6:
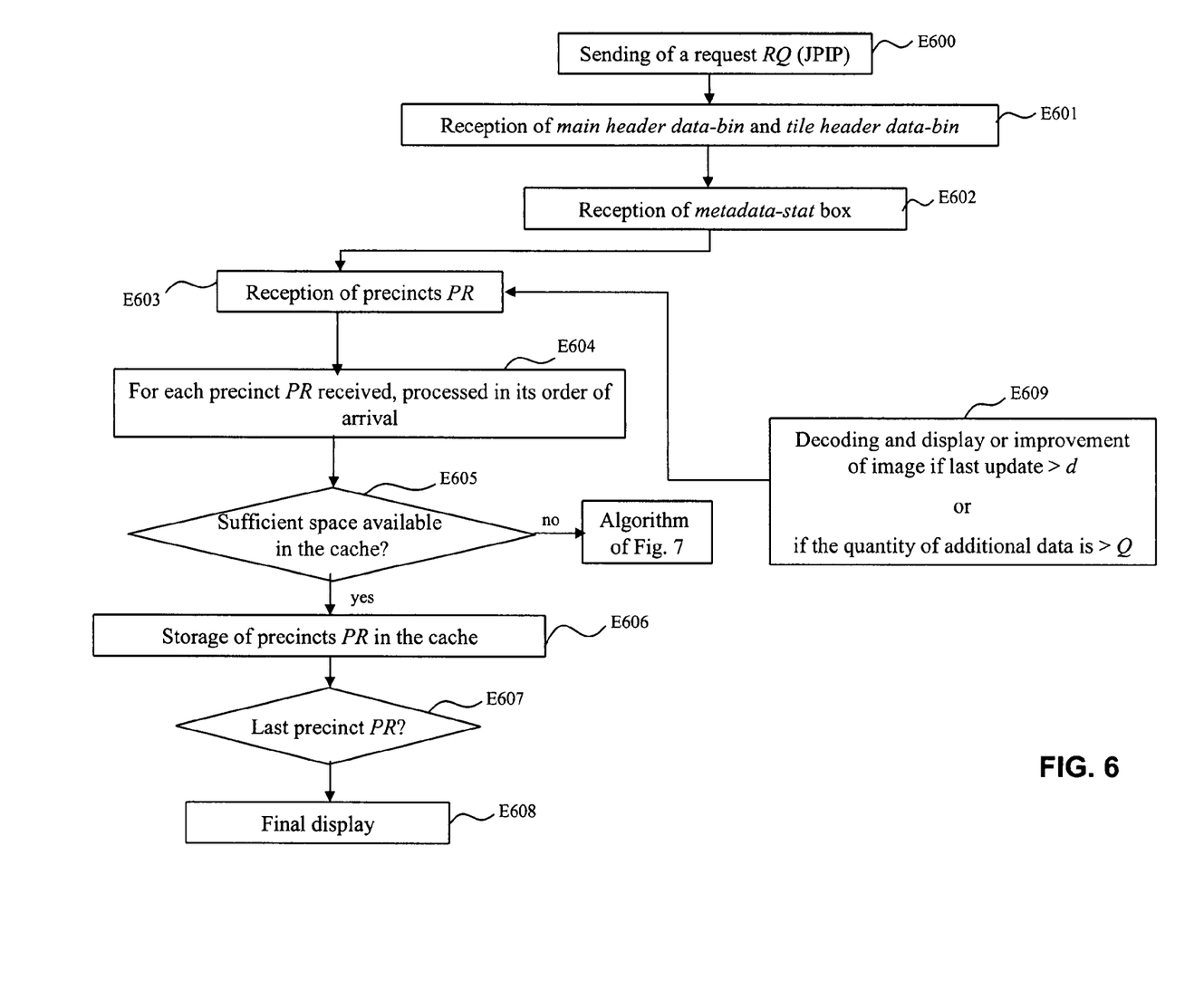
FIG. 6 is a functional flow diagram relating to the functioning of the client device.

As shown in FIG. 6, the algorithm implanted in the client device $11_n$ begins with a step E600, which corresponds to the sending to the server device 10 of a request RQ with the JPIP protocol.

At a step E601, the client device $11_n$ receives the header main header data-bin of the image and the headers tile header data-bin of the tiles requested coming from the server device 10.

Step E601 is followed by a step E602, during which the client device $11_n$ receives the metadata-stat box associated with the data which it has requested. The client device $11_n$ then proceeds with the extraction of the statistical data of the precincts PR and thus knows, for each precinct PR requested, identified by its intra-class identifier Id, the value of the corresponding transmission rate $TT_{Id}$.

The statistical data extracted are stored in a three-dimensional table TAB_CLIENT.

The first and second dimensions of the table TAB_CLIENT preferably represent respectively the number of tiles and the number of color components in the image. The number of tiles and the number of color components in the image are contained in the header main header data-bin (refer to paragraph A.3 of reference [2] and to Annex A of reference [1]).

The third dimension of the table TAB_CLIENT represents the number of precincts PR per tile. The number of precincts PR per tile can be deduced from the information contained in the header main header data-bin and/or the header tile header data-bin. Knowing the number of components, the number of tiles and the intra-class identifier Id of the precinct PR, it is possible to deduce from equality (1) the index of the tile t, the index of the component c and the number of sequences s of the precinct PR in question and to position the transmission rate $TT_{Id}$ in the table TAB_CLIENT.

The table TAB_CLIENT is preferably kept for as long as the client device $11_n$ is manipulating the same image. The table TAB_CLIENT is re-updated at each new request RQ (JPIP). The client device $11_n$ then completes its statistical data on the image whilst it is manipulating it.

A step E603 is then executed, after step E602, during which the client device $11_n$ receives the precincts PR.

At a step E604, the precincts PR received are processed successively by the client device $11_n$ in their order of arrival. In this step E604, the client device $11_n$ recovers in particular the size of each precinct PR. The size of the precinct PR is obtained by the client device $11_n$ by reading the header of the entity precinct data-bin in which the precinct PR is encapsulated when it is sent by the server device 10, in accordance with the JPIP protocol. Refer in particular to Annex A of reference [2] indicated above for more information on the entity precinct data-bin.

After step E604, a step E605 is executed in which the client device $11_n$ compares the size of the current precinct PR with the memory space available in its cache in order to determine whether the space available in the cache is sufficient to store the current precinct PR.

When the memory space available in the cache is not sufficient, the client device $11_n$ executes the algorithm in FIG. 7, described below, in order to release memory space in the cache.

Considering here that the memory space available in the cache is sufficient, step E605 is followed by a step E606 corresponding to the storage of the precinct PR in the cache of the client device $11_n$.

A step E607 then makes it possible to determine whether or not the current precinct PR is the last precinct PR requested.

In the negative at step E607, that is to say in the case where there remain precincts PR to be received, the algorithm continues with a step E609.

At step E609, an interval of time $\Delta t$ is determined between the time of the last updating of the image displayed and the current time.

In the case where this interval of time $\Delta t$ is greater than a predetermined time d, the data received relating to the image zone to be displayed are decoded and displayed before returning to step E603. In the contrary case, that is to say if the interval of time $\Delta t$ is not greater than the predetermined time d, the algorithm returns directly to step E603 without decoding and display of the received data.

According to a variant, there is calculated at step E609 not an interval of time between the time of the last updating of the displayed image and the current time, but a quantity of data received since the last passage through this step E609. If the quantity of data received is greater than a predetermined quantity Q, the image is refreshed before passing to step E603. In the contrary case, the algorithm continues directly through step E603, without refreshing the image.

At step E607, when it is determined that the current precinct PR is the last precinct PR requested, this means that all the precincts PR have been received, and at step E608 the final version of the image is displayed.

Figure 7:
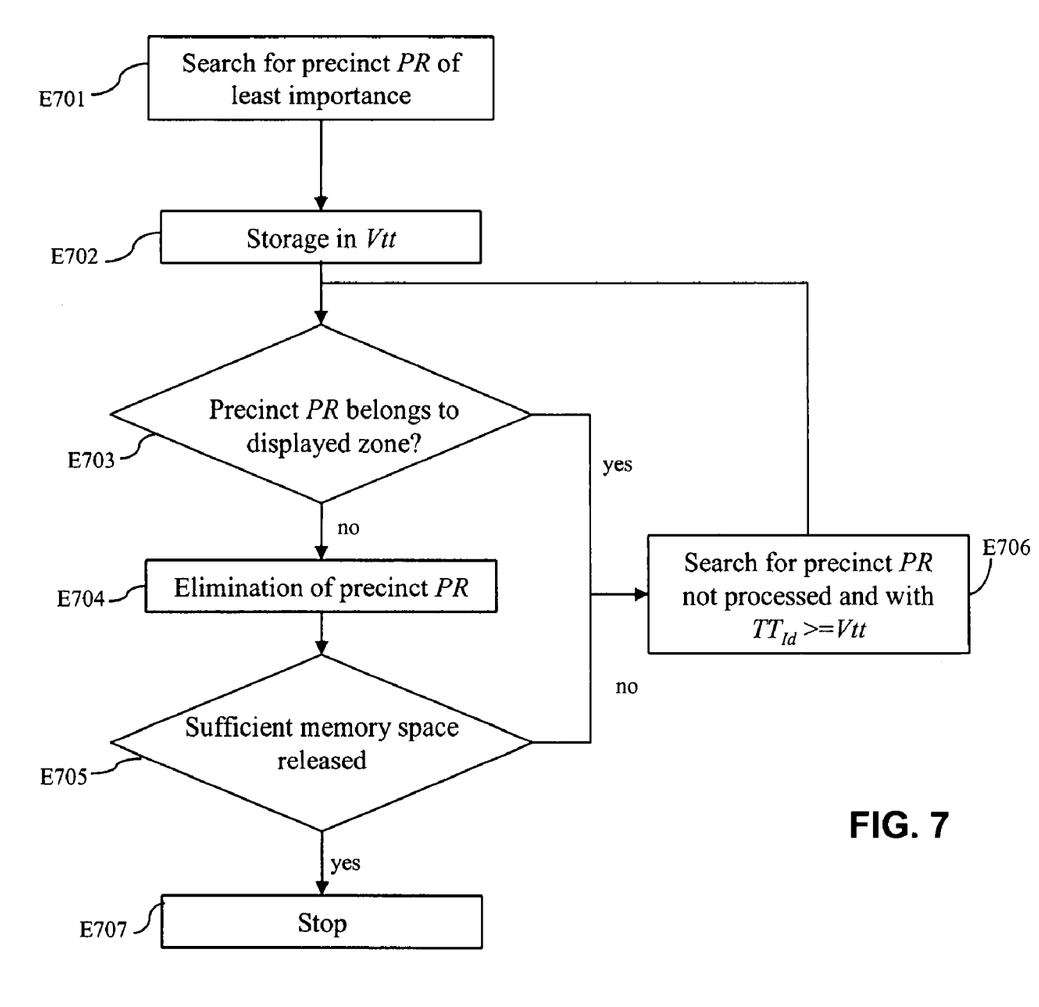
FIG. 7 is a functional flow diagram relating to the release of memory space in the cache of the client device.

With reference to FIG. 7, a description is now given of the procedure of the algorithm relating to the release in the cache of sufficient memory space to store therein the current precinct PR, this procedure being executed when it is detected at step E605 that the space available in the cache is not large enough to store the current precinct PR therein.

This procedure of releasing space in the memory begins at step E701 with the search in the table TAB_CLIENT for the precinct PR having the lowest transmission rate $TT_{Id}$. The value of the transmission rate $TT_{Id}$ of the precinct PR having the lowest transmission rate $TT_{Id}$ is stored in the variable Vtt at a step E702.

A step E703 is then executed after step E702 in order to determine whether or not the current precinct PR belongs to the zone to be displayed.

In the case where, at step E703, it is determined that the current precinct PR does not belong to the zone to be displayed, the current precinct PR is eliminated from the cache at a step E704. A step E705 is executed afterwards in order to determine whether or not the memory space released by the elimination of the current precinct PR is sufficient.

If, at step E705, it is determined that the memory space released is sufficient, the procedure of releasing memory space stops, step E707, and the algorithm continues with step E606 described above with reference to FIG. 6.

In the case where, at step E703, it is determined that the precinct PR belongs to the zone to be displayed or if it is determined at step E705 that the memory space released is insufficient, a step E706 is then executed.

At step E706, a precinct PR is sought which has not yet been processed and has a transmission rate $TT_{Id}$ equal to or immediately greater than Vtt. When a precinct PR satisfying the above condition has been found, the variable Vtt takes the value of the transmission $TT_{Id}$ of the precinct PR found and the procedure continues at step E703.

The functioning of the client device $11_n$ in the case of use of the second method of coding metadata-stat boxes described above is now described still with reference to FIGS. 6 and 7.

With the use of the second method of coding metadata-stat boxes, the behavior of the client device $11_n$ is somewhat modified compared with that described above, which corresponds to the use of the first method of coding metadata-stat boxes.

This is because, in the case of the use of the second coding method, the client device $11_n$ does not know the intra-class identifier Id of the precincts PR represented by their respective transmission rates $TT_{Id}$ when the metadata-stat box is received at step E602. The client device $11_n$ knows only the order in which the precincts PR must arrive.

The client device $11_n$ must therefore await the reception of the entities precinct data-bin comprising the intra-class identifier Id of the precinct PR which contain these entities precinct data-bin in order to make the link between the intra-class identifier Id and the transmission rate $TT_{Id}$. With the second method of coding the metadata-stat boxes, the table TAB_CLIENT is filled only at step E603.

The other steps in FIGS. 6 and 7 described above are not modified with the use of the second method of coding the metadata-stat boxes.

The invention claimed is:

1. A method of transmitting digital images implemented in a server device that communicates with at least one client device connected to the server device through a telecommunication network, said digital images comprising a plurality of elementary entities and said client device requesting from the server device a transmission of at least one said elementary entity, the method comprising the steps of:
    storing in said server device statistical data for each of said elementary entities; and
    upon receiving the request from the client device, transmitting to the client device said elementary entities in an order depending upon said statistical data, wherein said statistical data for a given elementary entity is representative of the quantity of data transmitted for said given elementary entity to the requesting client device.

2. A method according to claim 1, wherein said statistical data comprise a transmission ratio calculated for each of said elementary entities and which is a function of the number of requests received for the elementary entity in question and the quantity of data transmitted following these requests to the requesting client device for said elementary entity in question.

3. A method according to claim 1, further comprising a step of:
    sending said statistical data conjointly with said corresponding elementary entities.

4. A method according to claim 1, further comprising a step of:
    prior to the storage of said statistical data,
    coding said statistical data in a sequential order corresponding to an order of the respective spatial positions of said corresponding elementary entities in the digital image, so as to exploit spatial correlations existing between said elementary entities and thus to reduce a bit rate of said statistical data by removal of a redundant transmission of identical successive quantized values of said statistical data.

5. A method according to claim 1, further comprising a step of:
    prior to the storage of said statistical data,
    coding said statistical data in a sequential order corresponding to an order of importance of said corresponding elementary entities, so as to exploit correlations existing between the quantized values of the statistical data and thus to reduce a bit rate of said statistical data by the elimination of a redundant transmission of identical successive quantized values.

6. A method according to claim 1, wherein said digital image file is a file of the JPEG2000 type and said elementary entity is requested from said server device by said client device by means of a protocol of the JPIP type, and said statistical data are encapsulated in the form of metadata in said digital image file.

7. A method of receiving digital images implemented in a client device connected to at least one server device through a telecommunications network, said digital images comprising a plurality of elementary entities and said client device requesting from said server device a transmission of at least one said elementary entity, the method comprising the steps of:
receiving at least one said elementary entity requested by the client device and statistical data corresponding to said elementary entity, said statistical data being representative of user interest for said elementary entity compared to user interest for other elementary entities; and
updating a cache comprising elementary entities of the digital image according to said statistical data so as to allow display of said elementary entities.

8. A method according to claim 7, wherein said updating step comprises:
checking whether available memory space in the cache is sufficient for storing said received elementary entity; and
in case said available memory space is not sufficient, eliminating from said cache at least one elementary entity which corresponding statistical data represent a user interest lower than the user interest for said received elementary entity.

9. A method according to claim 7, wherein said step of eliminating comprises a substep of:
selecting as being said elementary entity to be eliminated the elementary entity which corresponding statistical data represent the lowest user interest amongst the elementary entities present in said cache and which are not currently being displayed.

10. A device for transmitting digital images incorporated in a server device that communicates with at least one client device connected to the server device through a telecommunications network, said digital images comprising a plurality of elementary entities and said client device requesting from said server device a transmission of at least one said elementary entity, the device comprising:
storing means for storing statistical data for each of said elementary entities; and
transmitting means for transmitting to said client device, upon receiving the request, said elementary entities in accordance with said statistical data, wherein said statistical data comprise the quantity of data transmitted following the request to the requesting client device.

11. A device according to claim 10, wherein said statistical data comprise a transmission rate calculated for each of said elementary entities and which is a function of the number of requests received for the elementary entity in question and of the quantity of data transmitted following these requests to the requesting client devices for said elementary entity in question.

12. A device according to claim 10, further comprising:
inserting means for inserting in said transmission file said statistical data conjointly with said corresponding elementary entities;
said statistical data being tranmitted also to said client device, conjointly with said elementary entities requested.

13. A device according to claim 12, wherein said inserting means encapsulates said statistaical data in the form of metadata in said transmission file.

14. A device according to claim 12, further comprising:
coding means for coding, prior to their insertion in said transmission file said statistical data in a sequential order corresponding to an order of the respective spatial positions of said corresponding elementary entities in the digital image, so as to exploit spatial correlations existing between said elementary entities and thus to reduce a bit rate of said statistical data by the removal of a redundant transmission of identical successive quantized values of said statistical data.

15. A device according to claim 12, further comprising:
coding means for coding, prior to their insertion in said transmission file, said statistical data in a sequential order corresponding to an order of importance of said corresponding elementary entities, so as to exploit correlations existing between the quantized values of the statistical data and thus to reduce a bit rate of said statistical data by the elimination of a redundant transmission of identical successive quantized values.

16. A device according to claim 10, further comprising means able to manipulate a transmission file of the JPEG2000 type and means able to manipulate a request for an elementary entity made by means of a protocol of the JPJP type.

17. A device for receiving digital images incorporated in a client device connected to at least one server device through a telecommunications network, said digital images comprising a plurality of elementary entities and said client device requesting from said server device a transmission of at least one said elementary entity, the device comprising:
receiving means for receiving a transmission file comprising at least one said elementary entity requested by the client device and statistical data corresponding to said elementary entity, said statistical data allowing the evaluation of a relative importance for a user of said elementary entity;
extracting means for extracting said statistical data from said transmission file; and
updating means for updating a cache comprising elementary entities of the digital image according to said statistical data extracted so as to allow display of said elementary entities according to their relative importances.

18. A device according to claim 17, wherein said means for updating comprises:
means for releasing sufficient memory space for writing in said cache said elementary entity received, by elimination in said cache of at least one elementary entity of lesser importance than that of said elementary entity received.

19. A device according to claim 18, wherein said means of releasing memory space comprises:
means for selecting as being said elementary entity of lesser importance to be eliminated the elementary entity having the lowest importance amongst the said elementary entities present in said cache and which are not currently being displayed.

20. A device according to claim 17, further comprising means able to manipulate a transmission file of the JPEG2000 type and means able to manipulate a request for an elementary entity made by means of a protocol of the JPJP type.

21. A computer readable storage medium on which is stored a computer executable program, said program containing instructions for implementing the method according to claim 1, when the program is loaded into and executed by a computer system.

22. A computer readable storage medium on which is stored a computer executable program, said program containing instructions for implementing the method according to claim 7, when the program is loaded into and executed by a computer system.

23. A method of transmitting digital images implemented in a server device that communicates with at least one client device connected to the server device through a telecommunication network, said digital images comprising a plurality of elementary entities and said client device requesting from the server device a transmission of at least one said elementary entity, the method comprising the steps of:

storing, in the server device, statistical data for each of said elementary entities, said statistical data for a given elementary entity measuring user interest for said elementary entity compared to user interest for other elementary entities; and upon receiving the request from the client, transmitting to the client said elementary entities in an order depending upon said statistical data.

\* \* \* \* \*